April 9, 1946.  G. L. DIMMICK  2,397,929
REDUCTION IN REFLECTION FROM GLASS
Filed Dec. 30, 1942
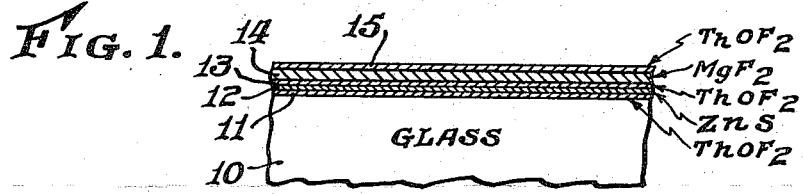
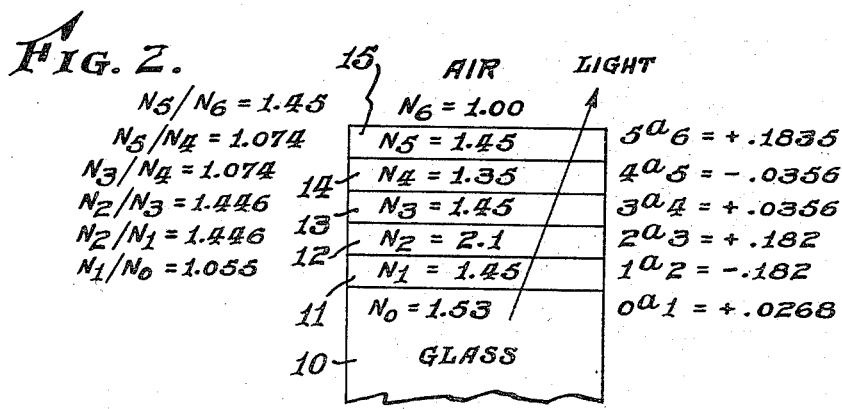
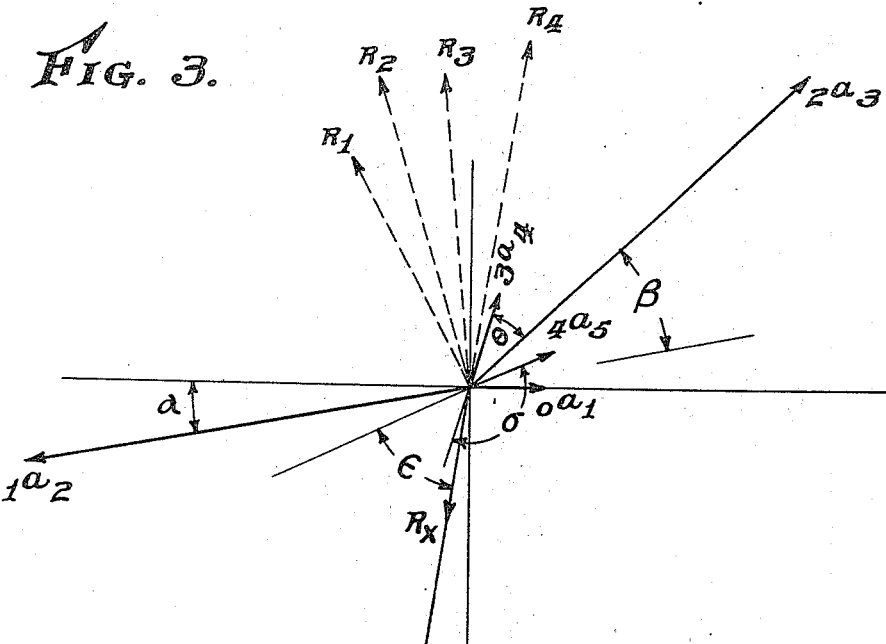
Inventor
Glenn L. Dimmick
By C. D. Tuska
Attorney Patented Apr. 9, 1946

2,397,929

UNITED STATES PATENT OFFICE 2,397,929

REDUCTION IN REFLECTION FROM GLASS

Glenn L. Dimmick, Indianapolis, Ind., assignor to Radio Corporation of America, a corporation of Delaware Application December 30, 1942, Serial No. 470,583

26 Claims. (Cl. 88—1)

This invention relates to reduction in reflection of radiant energy, particularly light, from the surface of glass, particularly from the surface of optical elements and is related to my application, Serial No. 464,018, filed October 31, 1942. Said application disclosed a multi-layer selectively reflective film including a material which is a compound of thorium and fluorine, probably thorium oxi-fluoride. Due to the high index of this material, it did not appear at first that the material could be used to produce a reflection reducing film although it was extremely hard and had high mechanical and chemical durability. The present application relates to a modification of the said multi-layer film to produce a minimum of reflection from the glass surface and at the same time to retain the advantages of mechanical strength and chemical resistance. This is accomplished by applying films in such relation of materials and thicknesses as to accomplish the reflection reducing result without undesirably affecting the characteristics of the surface film of the thorium compound.

My invention relates particularly to the reduction in reflection of light in the visible spectrum but it applies also to radiant energy outside the spectrum such as ultra violet and infra-red wavelengths. It will be understood in this specification that the term light will include such other forms of radiant energy.

One object of the invention is to provide a surface coating for optical elements having an extremely low reflection.

Another object of the invention is to provide a surface coating for optical elements having a very high mechanical strength.

Another object of the invention is to provide a surface coating having a chemical resistance exceeding that of some types of optical glass.

Other and incidental objects of the invention will be apparent to those skilled in the art from a reading of the following specification and an inspection of the accompanying drawing, in which:

Figure 1 is a greatly enlarged sectional view through my improved surface coating.

Figure 2 corresponds to Fig. 1 but the several coatings are not illustrated in proportionate thicknesses and the several indices of refraction and partial reflection are indicated; and Figure 3 is a vector diagram of the amplitudes of the light or other radiant energy reflected at the boundaries of the various media constituting the coating of Figures 1 and 2, and including the glass or other transparent support for the coating on the one hand and air or other medium to which the light passes on the other hand.

Fig. 1 illustrates what is at present the preferred form of the invention although many modifications thereof are quite practical.

In the form of the invention shown in Fig. 1, the glass 10 is first coated with a very thin evaporated film 11 of what I believe is thorium oxi-fluoride. This material is prepared by heating thorium fluoride $ThF_4 \cdot 4H_2O$ in a platinum crucible in a vacuum or in an inert gas. I prefer to use the term inert atmosphere to include a vacuum or an inert gas. When the thorium fluoride is prepared from thorium nitrate and hydrofluoric acid, it takes the tetrohydrated form given above. When this thorium fluoride is heated to 200° C. it gives off 3 molecules of water forming the monohydrate. If this monohydrate is heated in air to a red heat, it forms thorium oxide and hydrogen fluoride. If, however, the thorium fluoride monohydrate is heated to substantially red heat in a vacuum, the following reaction takes place $ThF_4 \cdot H_2O + heat = ThOF_2 + 2HF$. While there is reason to believe that the above compound $ThOF_2$ is formed, it is possible that the water of crystallization is merely driven off, leaving $ThF$, and I do not wish to be restricted to thorium oxi-fluoride when the resulting compound may be thorium fluoride.

The compound comprising thorium and fluorine prepared in this manner is placed in a platinum boat and heated to about 1000 degrees C. in a vacuum (preferably lower than 1 micron). At this temperature it melts and evaporates and it may be evaporated onto the optical surface to an appropriate thickness. The evaporated film of this material after it has been baked for several hours at a temperature of 70 degrees C. or somewhat higher, has a number of advantages over the other types of films in that it repels water, it is extremely hard, it has a very low surface friction, it is not soluble in pure water, salt water, or in alkaline solutions, it forms a very good bond with the glass and it is clear and transparent without appreciable absorption in the visible spectrum. Certain types of glass are hydroscopic and this coating material seals the glass against moisture. Although as indicated above, it is not absolutely certain that the material thus produced is thorium oxi-fluoride, for the purposes of the present specification, I will refer to it as such.

Before baking, the thorium oxi-fluoride has an index of refraction of approximately 1.45 which is too high in itself to be satisfactorily used as a reflection reducing coating. This coating is placed on the glass first because it has a very good adhesion to both glass and the subsequent coatings to be placed thereon. On the surface of this first layer 11 there is placed a second layer 12 of zinc sulphide which is likewise very thin. In referring to a very thin film I mean a film which does not have a thickness amounting to a measurable fraction of a wave length of light but which is nevertheless of sufficient thickness so that it is continuous. The zinc sulphide has the relatively high index of 2.1 and has the advantage of presenting a surface having this effective index. If a reflection reducing coating having a low index were placed on thorium oxi-fluoride, the reduction in reflection would not be sufficient for most purposes, while by adding the high index coating the reflection may be reduced to values much lower than is obtained from a ¼λ of magnesium fluoride. The effect of the high index layer in reducing reflection is best shown by means of the vector diagram Fig. 3.

Although I prefer zinc sulphide as the high index layer, there are other materials which may be used, such for example as lead fluoride, copper iodide, bismuth fluoride or bismuth oxifluoride. All of these materials are insoluble in water. When using these high index materials, the first thorium oxi-fluoride layer is not as essential since many of these materials adhere quite well directly to the glass. Bismuth fluoride is particularly good in this respect and a satisfactory film may be produced in only three layers if it is so desired. Lead fluoride may also be used although it is poisonous to work with. In this case we would have bismuth fluoride contiguous to the glass, magnesium fluoride over this and finally a covering layer of thorium oxi-fluoride.

Over the film of zinc sulphide 12 there is evaporated a second film of thorium oxi-fluoride 13 which is likewise very thin. The purpose of this film is to improve the adhesion of the next layer 14, the fourth, which is magnesium fluoride and which does not adhere too well to the zinc sulphide. The thorium oxi-fluoride adheres very well to both the zinc sulphide and the magnesium fluoride. The low index layer 14, of magnesium fluoride, is a little less than ¼λ thick for the light for which the minimum reduction in reflection is desired. The thickness should be enough less than ¼λ to allow for the application of the subsequent very thin layer producing a total effective optical thickness of substantially ¼λ. This magnesium fluoride is evaporated onto the surface in the same manner as the previous coatings. Although I have specifically referred to magnesium fluoride as my preferred material which is particularly desirable because it is chemically durable and convenient to use, there are other substances which can be used. Some are more desirable in some respects and others in other respects, but have disadvantages. For example, calcium fluoride may be used as described in Cartwright Reissue Patent No. 22,076, or calcium aluminum hydroxide fluoride may be used as described and claimed in my application, Ser. No. 408,807, filed August 29, 1941, or calcium fluoride or the evaporation product of a mixture of calcium fluoride and aluminum oxide may be used as described and claimed in my application, Ser. No. 248,815 filed July 31, 1940 (now Patent No. 2,338,233). The fifth layer 15 is again thorium oxi-fluoride and is evaporated to such a thickness as to result in the minimum overall reflection for the color desired. This outer coating of thorium oxi-fluoride very greatly increases the mechanical and chemical durability of the low reflecting coating. It is so durable that tests have shown it to stand a saturated solution of boiling salt water or boiling 10 percent sodium hydroxide solution without damage to the surface. The magnesium fluoride coating alone is incapable of withstanding either of these solutions and the glass surface is incapable of withstanding the sodium hydroxide solution. The thorium oxi-fluoride coating is also very hard and has such low surface friction that it is not scratched by any of the normal cleaning processes.

The multi-layer film is normally baked for an hour or more at a temperature of about 70 degrees C. in order to secure maximum adhesion and hardness.

In Fig. 2 the relative thicknesses of the layers are not drawn to scale and this figure shows the indices of refraction of various layers, the relative indices of refraction of the various layers and the calculated values of the reflected amplitudes at the six boundaries. The amplitudes are calculated from the equation $$_0a_1 = \frac{N_1/N_0 - 1}{N_1/N_0 + 1}$$

A complete vector diagram of the five layer film is shown in Fig. 3. This method of analysis is described in my technical paper entitled "A new dichroic reflector and its application to photocell monitoring systems" published in the Journal of the Society of Motion Picture Engineers for January 1942. The amplitudes shown in Fig. 2 are plotted to scale in Fig. 3. The angle $\alpha$, B, $\theta$, $\sigma$, $\epsilon$, represent the thickness of the various layers starting at the glass. The actual mechanical thickness of each layer is obtained from the relation $$t_1 = \frac{\alpha}{N_1} \frac{\lambda}{4\pi} \quad \text{and} \quad t_2 = \frac{B}{N_2} \frac{\lambda}{4\pi} \text{ etc.}$$

where $\lambda$ is the wave length of the light and N is the index of refraction of the layer. $R_1$, $R_2$, $R_3$, and $R_4$ (Fig. 3) are the resultants obtained by vectorial addition (by the parallelogram method) of the separate amplitudes as shown. $R_x$ is the final resultant and its length represents the final reflected amplitude. $R_x^2$ is the final value of the reflected intensity.

The zinc sulphide, the magnesium fluoride and the thorium oxi-fluoride were all evaporated from platinum containers. I have found platinum to be the best material for this purpose because it is chemically inert, it has a very high melting temperature, it has a very low vapor pressure. The magnesium fluoride and the thorium oxi-fluoride "wet" the platinum which helps to transfer the heat to the materials. The zinc sulphide sublimates at about 1100 degrees centigrade and goes directly from a solid to a vapor.

I claim as my invention:

1. In combination with a radiant energy transparent support medium, a transparent coating disposed on a surface of said support medium for reducing reflection of radiant energy from said surface into an adjacent medium, said coating comprising a plurality of continuous layers, one of said layers being of material of higher index of refraction than the support medium, another of said layers being of material of lower index of refraction than the support medium, and a third layer being of a compound including thorium and fluorine, said low index layer having an effective optical thickness less than one-quarter of a particular wave length of radiant energy, said high index layer and said thorium-fluorine compound layer each having an effective optical thickness less than a measurable fraction of said wave length such that the sum of the amplitude vectors representing the reflection from the boundaries between said layers and between said coating and said mediums respectively is a minimum for said wave length.

2. The invention as set forth in claim 1 wherein said high index material is a fluoride of bismuth.

3. In combination with a radiant energy transparent support medium, a transparent coating disposed on the surface of said support medium for reducing reflection of radiant energy from said surface into an adjacent radiant energy transparent medium, said coating comprising a layer of an alkali earth fluoride having a thickness less than ¼ of a desired wave length of radiant energy and a superposed layer of a compound of thorium and fluorine of such thickness that the sum of the amplitude vectors representing the reflection from the boundaries between said layers and between said coating and said mediums, respectively, is a minimum for said desired wave length.

4. In combination with a radiant energy transparent support medium, a transparent coating disposed on the surface of said support medium for reducing reflection of radiant energy from said surface into an adjacent radiant energy transparent medium, said coating comprising a layer of magnesium fluoride having a thickness less than ¼ of a desired wave length of radiant energy and a layer of a compound of thorium and fluorine of such thickness that the sum of the amplitude vectors representing the reflection from the boundaries between said layers and between said coating and said mediums, respectively, is a minimum for said desired wave length.

5. The invention as set forth in claim 1 wherein a layer of a compound of thorium and fluorine is contiguous to one of said mediums.

6. The invention as set forth in claim 1 wherein a layer of a compound of thorium and fluorine is contiguous to one of said mediums and another of such layers is disposed between said high and low index layers.

7. In combination with a light energy transparent support medium, a transparent coating disposed on the surface of said support medium for reducing reflection of light energy from said surface into an adjacent light energy transmitting medium, said coating comprising a plurality of superposed layers, said layers comprising, respectively, a compound of thorium and fluorine, zinc sulphide, a compound of thorium and fluorine, magnesium fluoride, and a compound of thorium and fluorine, in the order listed from said support medium to said adjacent medium, said layers being of such thicknesses that the sum of the amplitude vectors representing the reflection from the boundaries between said layers and between said coating and said mediums are substantially a minimum for a desired wavelength.

8. In combination with a radiant energy transparent support medium, a transparent coating disposed on the surface of said support medium for reducing reflection of radiant energy from said surface into an adjacent radiant energy transparent medium, said coating comprising a plurality of superposed adherent thin layers, a first of said layers comprising a compound of bismuth and fluorine and having a relatively high index of refraction, a second of said layers being of a different material characterized by relatively low index of refraction, said layers being of such thicknesses that the sum of the amplitude vectors representing the reflection from the boundaries between said layers and between said coating and said mediums, respectively, is a minimum for said desired wave length.

9. The invention as set forth in claim 8 wherein said first layer is contiguous to said support medium.

10. The invention as set forth in claim 8 wherein said first layer is next adjacent said support medium and contiguous to said second layer, and a third of said layers characterized by great chemical and physical resistance is contiguous to said second layer and to said adjacent medium.

11. The invention as set forth in claim 8 wherein a third of said layers is a compound of thorium and fluorine.

12. The invention as set forth in claim 8 wherein a third of said layers is a compound of thorium and fluorine contiguous to said adjacent medium.

13. The invention as set forth in claim 8 wherein said second of said layers is an alkaline earth compound and a third of said layers is a compound of thorium and fluorine contiguous thereto and to said adjacent medium.

14. The invention as set forth in claim 8 wherein said second layer is an alkaline earth compound having a thickness less than ¼ of a desired wave length of radiant energy and wherein a third of said layers is a compound of thorium and fluorine contiguous thereto and to one of said mediums.

15. In combination with a radiant energy transparent support medium, a transparent coating disposed on the surface of said support medium for reducing reflection of radiant energy from said surface into an adjacent radiant energy transparent medium, said coating comprising a plurality of superposed adherent thin layers, a first of said layers comprising bismuth fluoride, a second of said layers comprising magnesium fluoride, and a third of said layers comprising a compound of fluorine and thorium, said layers being contiguous to each other and to said mediums in the order listed from said support medium to said adjacent medium, said layers being of such thicknesses that the sum of the amplitude vectors representing the reflection from the boundaries between said layers and between said coating and said mediums are substantially a minimum for a desired wavelength.

16. In combination, a transparent support, a layer of an alkali earth fluoride having a thickness than than ¼ wave length of light on the surface thereof and a layer of thorium oxi-fluoride on the surface of said layer of alkali earth fluoride of such thickness that with the layer of alkali earth fluoride it has a total effective thickness approximating ¼ of a wave length of light.

17. In combination, a transparent support, a layer of magnesium fluoride having a thickness less than ¼ wave length of light on the surface thereof and a layer of thorium oxifluoride on the surface of said layer of magnesium fluoride of such thickness that with the layer of magnesium fluoride it has a total effective thickness of approximating ¼ of a wave length of light.

18. In combination, a transparent support, a very thin layer of thorium oxi-fluoride on the surface thereof, a layer of an alkali earth fluoride having a thickness less than ¼ wave length of light on the surface of the thorium oxifluoride and a layer of thorium oxi-fluoride on the surface of said layer of alkali earth fluoride of such thickness that with the layer of alkali earth fluoride it has a total effective thickness approximating ¼ of a wave length of light.

19. In combination, a transparent support, a very thin layer of thorium oxi-fluoride on the surface thereof, a layer of magnesium fluoride having a thickness less than ¼ wave length of light on the surface of the thorium oxi-fluoride and a layer of thorium oxi-fluoride on the surface of said layer of magnesium fluoride of such thickness that with the layer of magnesium fluoride it has a total effective thickness approximating ¼ of a wave length of light.

20. In combination a transparent support, a very thin and closely adherent layer of thorium oxi-fluoride on the surface thereof, a layer of material having a high index of refraction on the surface of said layer of thorium oxi-fluoride, a second layer of thorium oxi-fluoride on the surface of said layer of material of high index of refraction, a layer of an alkali earth fluoride having thickness less than ¼ wave length of light on the surface of the thorium oxi-fluoride and a layer of thorium oxi-fluoride on the said layer of alkali earth fluoride of such thickness that with the layer of alkali earth fluoride it has a total effective thickness approximating ¼ of a wave length of light.

21. In combination, a transparent support, a very thin and closely adherent layer of thorium oxi-fluoride on the surface thereof, a very thin layer of material having a high index of refraction on the surface of said layer of thorium oxi-fluoride, a second layer of thorium oxi-fluoride on the surface of said layer of material of high index of refraction, a layer of an alkali earth fluoride having a thickness less than ¼ wave length of light on the surface of the thorium oxi-fluoride and a layer of thorium oxi-fluoride on the said layer of alkali earth fluoride of such thickness that with the layer of alkali earth fluoride it has a total effective thickness approximating ¼ of a wave length of light.

22. In combination with a light energy transparent support medium, a transparent coating disposed on the surface of said support medium for reducing reflection of light energy from said surface into an adjacent energy transmitting medium, said coating comprising a plurality of superposed layers, a pair of said layers having substantially different indices of refraction, the layer of said pair adjacent the support medium being composed of a material having a higher index of refraction than said support medium and the other layer of said pair having an index of refraction of the order of 1.35, another of said layers of said plurality being of a compound of thorium and fluorine, said layers being of such thicknesses that the sum of the amplitude vectors representing the reflection from the boundaries between said layers and between said coating and said mediums, respectively, is a minimum for a desired wavelength.

23. The invention as set forth in claim 22 wherein a layer of a compound of thorium and fluorine is contiguous to one of said mediums.

24. The invention as set forth in claim 22 wherein a layer of a compound of thorium and fluorine is contiguous to each of said mediums.

25. The invention as set forth in claim 22 wherein a layer of a compound of thorium and fluorine is contiguous to one of said mediums and another such layer is disposed between said pair of layers.

26. The invention as set forth in claim 22 wherein a layer of a compound of thorium and fluorine is contiguous to each of said mediums and another such layer is disposed between said pair of layers.

GLENN L. DIMMICK.